United States Patent [19]
Gordon

[11] Patent Number: 5,611,524
[45] Date of Patent: Mar. 18, 1997

[54] ADJUSTABLE ELASTOMER BIAS DEVICE USING BENDABLE RESILIENT RODS

[75] Inventor: James R. Gordon, Benton, Ill.

[73] Assignee: Gordon Research & Development, Inc., Pinckneyville, Ill.

[21] Appl. No.: 458,042

[22] Filed: Jun. 1, 1995

[51] Int. Cl.⁶ ........................................ F16F 1/14
[52] U.S. Cl. .......................... 267/154; 198/499; 267/279; 267/277
[58] Field of Search .................................. 267/273, 276, 267/277, 279, 285, 293, 154; 198/499, 497; 464/97

[56] References Cited

U.S. PATENT DOCUMENTS

| | | |
|---|---|---|
| 2,690,335 | 9/1954 | Ballard . |
| 3,022,536 | 2/1962 | Floehr . |
| 3,124,342 | 3/1964 | Ormond ................................. 267/154 |
| 3,748,687 | 7/1973 | Romberg . |
| 4,171,920 | 10/1979 | Kramer et al. . |
| 4,533,036 | 8/1985 | Gordon . |
| 4,723,790 | 2/1988 | Wharton ............................... 267/279 X |
| 4,925,434 | 5/1990 | Swinderman et al. . |
| 5,149,305 | 9/1992 | Gordon . |
| 5,201,402 | 4/1993 | Mott . |
| 5,222,589 | 6/1993 | Gordon . |
| 5,417,407 | 5/1995 | Gordon ................................... 267/154 |

FOREIGN PATENT DOCUMENTS

| | | | |
|---|---|---|---|
| 1430369 | 1/1966 | France ................................... 267/154 |

*Primary Examiner*—Josie Ballato
*Attorney, Agent, or Firm*—Dorn, McEachran, Jambor & Keating

[57] ABSTRACT

An adjustable elastomer bias device includes a base member (metal or rigid plastic) having plural receptacles for receiving one end of each of a like plurality of bendable, resilient, elastomer rods. An index member is included in the device; the index member has plural rod guide passages and each elastomer rod passes through one guide passage so that the index member can slide longitudinally along the rods, toward and away from the base member. The index member is anchored at one of several displacement distances from the base member to change the effective stiffness (bias) of the rods. The index member may be rotated for torsional bias or moved laterally for linear bias to effect a further bias adjustment; a retainer holds the additional bias adjustment. The bias force of the device results from bending of the elastomer rods.

16 Claims, 4 Drawing Sheets

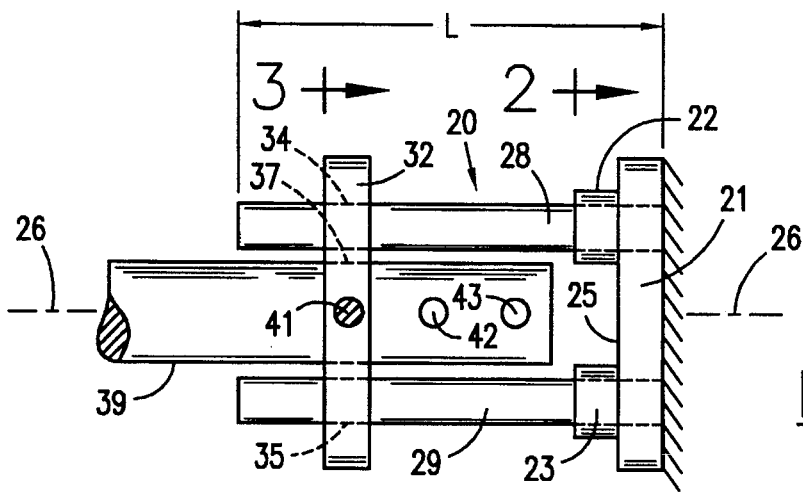
FIG. 1
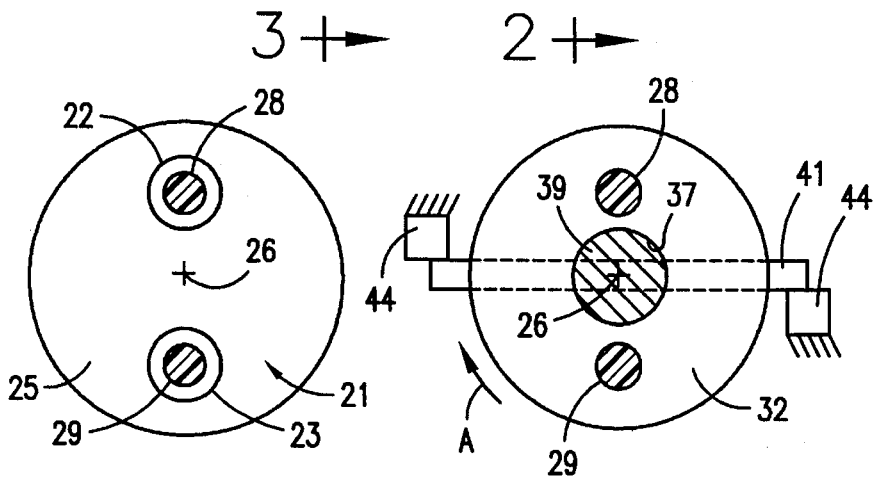
FIG. 2
FIG. 3
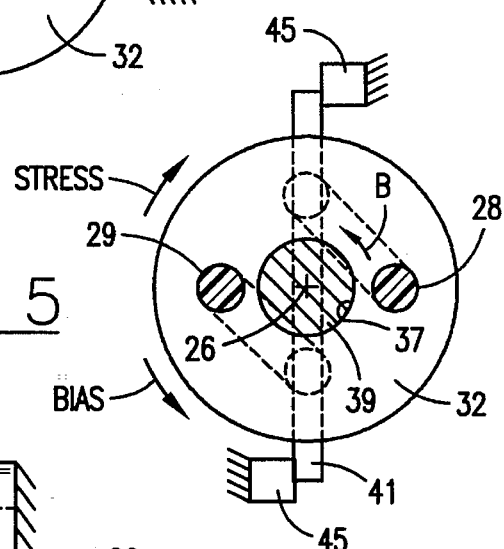
FIG. 5
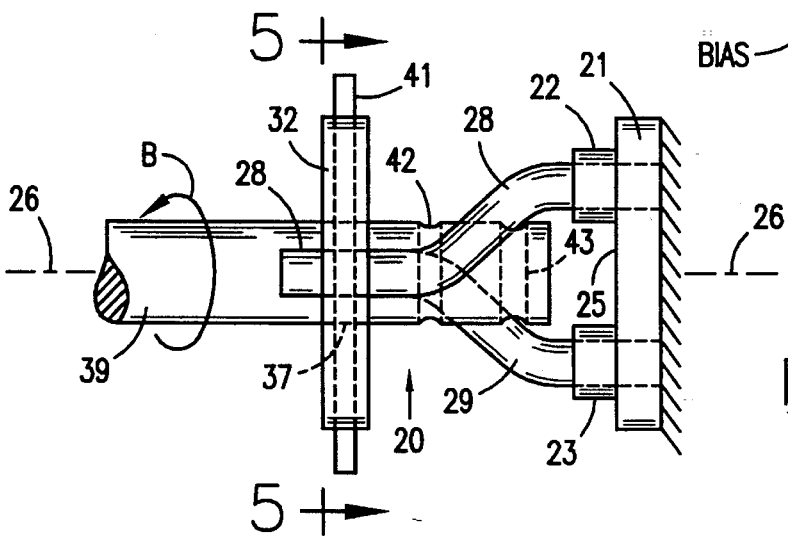
FIG. 4

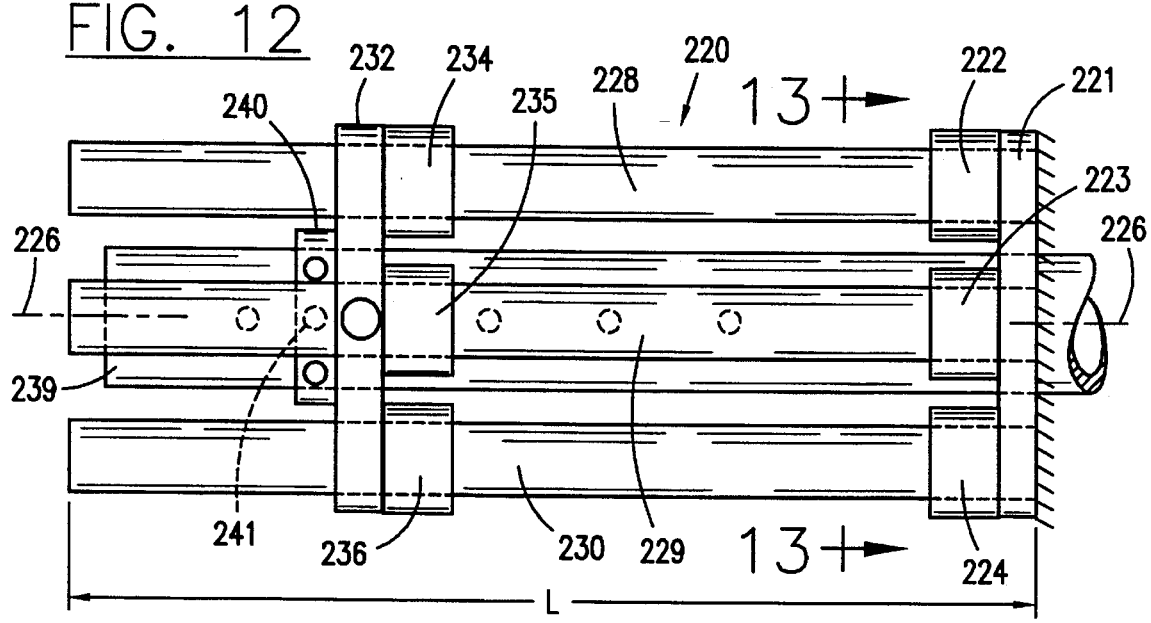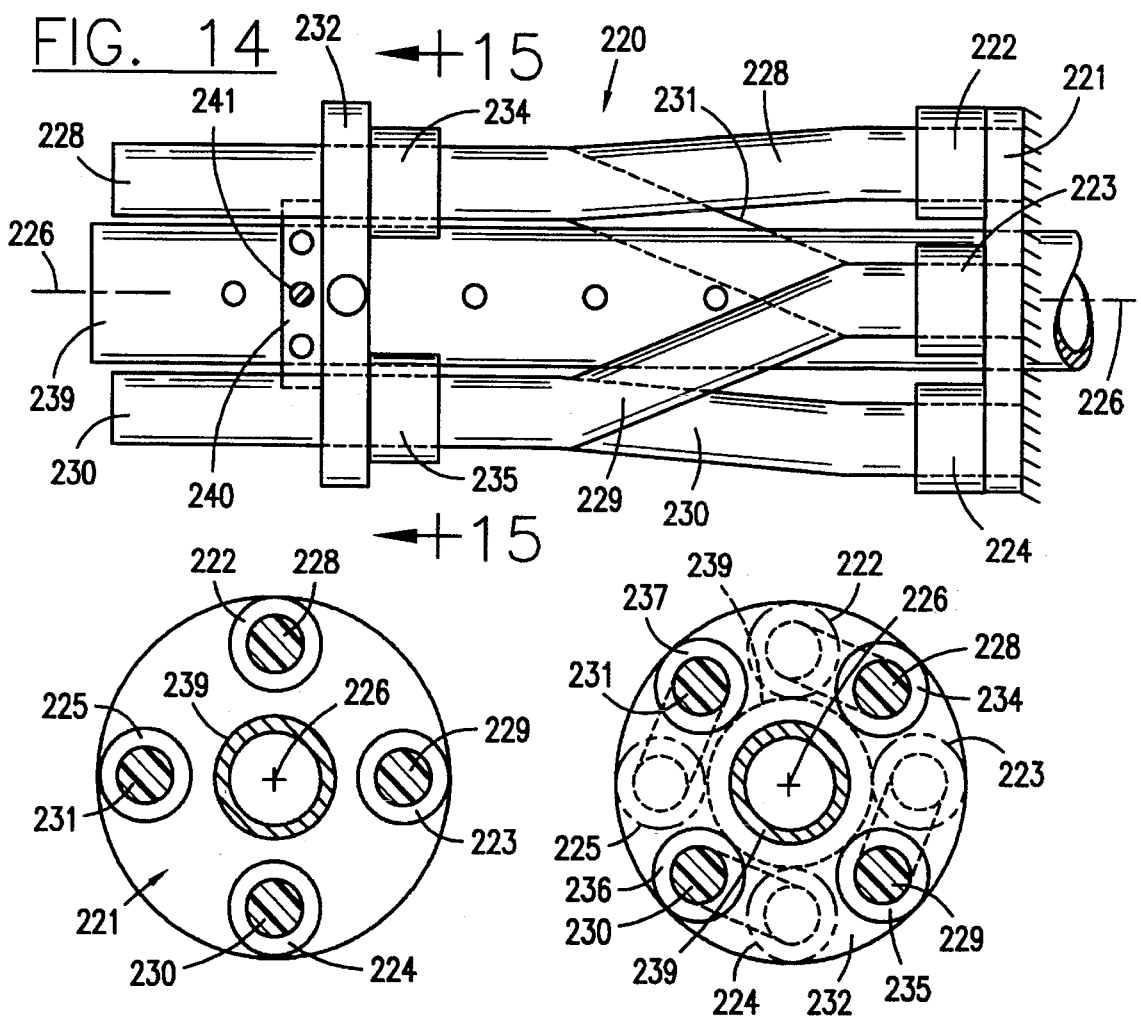

ADJUSTABLE ELASTOMER BIAS DEVICE USING BENDABLE RESILIENT RODS

BACKGROUND OF THE INVENTION

Elastomer torsion springs have been utilized in a number of different applications; one such torsion spring is disclosed in Kramer et al. U.S. Pat. No. 4,171,920. Specific applications for elastomer torsion springs are quite numerous; among others, they include vehicle shock absorbers, gate closers, and biasing devices (often called tensioners) for conveyor belt scrapers. Some can be set in increments to supply a given torsional force; such devices include the conveyor belt scraper torsion biasing devices (tensioners) disclosed in Gordon U.S. Pat. No. 4,533,036 and in Swinderman et al. U.S. Pat. No. 4,925,434. Continuously adjustable torsion bias devices, suitable for use as tensioners in conveyor belt scrapers or in physical therapy apparatus, are also described in Gordon U.S. Pat. Nos. 5,149,305 and 5,417,407.

Known adjustable elastomer bias devices are usually torsion bias devices; the elastomer that is stressed to provide a bias force is most often in the form of one or two elastomer cylinders, twisted to pre-stress the device. Such devices, as exemplified by those described in the aforementioned Gordon and Swinderman et al. patent documents, are rather limited in the range of available bias force. Thus, to cover all requirements a plurality of different bias devices may be required for a given application, a rather devices may be required for a given application, a rather uneconomic requirement. Moreover, most known elastomer bias devices are not well adapted to use in both torsional and linear bias applications.

SUMMARY OF THE INVENTION

It is a object of the present invention to provide a new and improved elastomer bias device that uses a plurality of bendable resilient elastomer rods as the bias elements and that can be adjusted to afford either torsional or linear bias over a wide bias force range.

Another object of the invention is to provide a simple, inexpensive, and durable elastomer bias device that can be readily adjusted to virtually any bias force requirement, whether torsional or linear.

Accordingly, the invention relates to an adjustable elastomer bias device that comprises a base member having N base receptacles and N elongated elastomer rods, each rod having a predetermined length of at least L; one end of each elastomer rod is mounted in each base receptacle with the rods projecting from the base member in a preselected direction. The device further includes an index member having at least N rod guide passages therethrough, each guide passage through the hub having a cross-sectional area larger than one of the elastomer rod that passes therethrough so that the index member is movable longitudinally of the elastomer rods. Anchor means are provided for anchoring the index member at any one of a plurality of different displacements, in the preselected direction, from the base member. The bias force afforded by the device is derived from bending of the elastomer rods.

DESCRIPTION OF THE DRAWINGS

FIG. 1 is a side elevation view of an adjustable elastomer torsion bias device comprising a first simplified embodiment of the invention, with the device shown in an unstressed condition;

FIG. 2 is a cross section view taken approximately along line 2—2 in FIG. 1;

FIG. 3 is a cross section view taken approximately along line 3—3 in FIG. 1;

FIG. 4 is a side elevation view of the torsion bias device of FIG. 1 but with the device shown in a stressed condition;

FIG. 5 is a cross section view like FIG. 3 but taken approximately along line 5—5 in FIG. 4;

FIG. 12 is a side elevation view of an unstressed adjustable elastomer torsion bias device comprising a preferred embodiment of the invention;

FIG. 13 is a cross section view taken approximately along line 13—13 in FIG. 12;

FIG. 14 is an elevation view like FIG. 12 but with the adjustable elastomer torsion bias device in a stressed condition;

FIG. 15 is a cross section view taken approximately along line 15—15 in FIG. 14;

DESCRIPTION OF THE PREFERRED EMBODIMENTS

FIGS. 1–5

Figure 6:
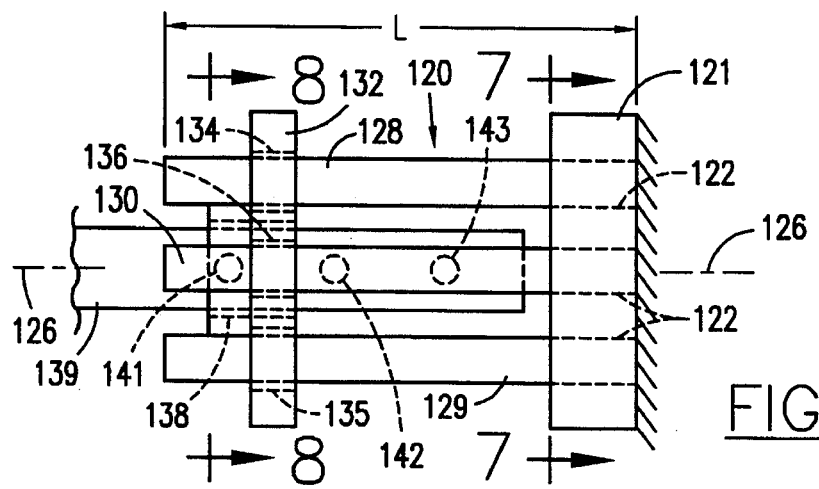
FIG. 6 is an elevation view of an adjustable linear elastomer bias device comprising another simplified embodiment of the invention, with the device unstressed.

FIGS. 1 and 4 are side elevation views of an adjustable elastomer torsion bias device 20 constructed in accordance with a first simplified embodiment of the invention. In FIG. 1 device 20 is unstressed; in FIG. 4 it has been pre-stressed to afford an additional resilient rotary bias, as explained hereinafter. FIGS. 2 and 3 afford cross sectional views of device 20, taken approximately along lines 2—2 and 3—3, respectively, in FIG. 1. FIG. 5 is a cross sectional view taken approximately along line 5—5 in FIG. 4.

Device 20, FIGS. 1 and 4, comprises a rod holder 21, sometimes referred to as a base member. There are two base receptacles 22 and 23 projecting from one face 25 of base member 21; receptacles 22 and 23 are disposed in alignment with each other on opposite sides of a central axis 26. The distribution and arrangement of the receptacles in relation to axis 26 and base member 21 is best shown in FIG. 2.

In the construction illustrated for the torsion bias device 20, in FIGS. 1, 2, and 4 base member 21 is a flat circular plate that is centered on axis 26. Base member 21 and its receptacles 22 and 23 may be a metal casting or may be formed as a metal plate with the receptacles welded to surface 25. A molded rigid plastic base member 21 may also be used. The particular construction selected for base member 21 and its rod receptacles is of minor importance with respect to the present invention. However, it is desirable that base member 21 be firmly mounted on a frame (not shown) or other fixed structure.

The adjustable elastomer torsion bias device 20 of FIGS. 1–5 further comprises N elongated elastomer rods 28 and 29; as illustrated, N=2. Each rod has one end fixedly mounted in one of the base receptacles 22 and 23. Thus, one end of rod 28 is fixedly mounted in base receptacle 22 and one end of elastomer rod 29 is held in receptacle 23. Each elastomer rod has a predetermined length of at least L (FIG. 1); in a typical torsion device 20 length L may be about ten inches (25.4 cm). The rod length L determines the overall length device 20 and can vary considerably, depending on the elastomer used for rods 28 and 29 and the characteristics of those rods as to bendability, resilience, and related factors. A preferred material for the elastomer rods is urethane having a hardness of about seventy to eighty on a Shore A scale. Rods 28 and 29 are illustrated as having a solid circular cross-sectional configuration with a diameter of about one inch (2.54 cm), but their cross-sectional shape is not critical and can be varied to suit available materials. The cross-sectional shape of base receptacles 22 and 23, on the other hand, is preferably matched to the external configuration of the rods with which the receptacles are used, so that the rods will all be firmly mounted in base member 21. Rods 28 and 29 are shown parallel to axis 26 and perpendicular to surface 25 of base member 21; these relationships can be modified to fit application requirements.

Adjustable torsion bias device 20, FIGS. 1 and 4, further includes an index member or hub 32 that is also shown in FIGS. 3 and 5. Hub 32 is shown as having a circular shape; the shape of the index member could be a regular polyhedron or almost any other desired shape. There are two rod guide passages 34 and 35 through index hub 32; passage 34 encompasses rod 28 and rod 29 extends through passage 35 (see FIG. 1). Thus, in the unstressed condition for device 20 shown in FIGS. 1–3, the guide passages 34 and 35 for elastomer rods 28 and 29 are aligned with the base receptacles 22 and 23 for those same rods. For the pre-stressed condition shown in FIGS. 4 and 5, however, with index hub 32 rotated through an angle of ninety degrees clockwise in comparison with FIGS. 1 and 3 to stress device 20, the rod receptacles of base member 21 and the rod guide passages of hub 32 are not so aligned. Rods 28 and 29 are straight in the unstressed condition (FIGS. 1–3) but the same rods are bent when stressed, as shown in FIGS. 4 and 5. Some twisting of elastomer rods 28 and 29 may also occur when the rods are stressed, but twisting of the rods is no more than minimal; it is the bending of the rods that enables device 20 to afford a resilient torsional bias.

Index hub 32 has a central aperture 37 centered on axis 26. A shaft 39 extends through aperture 37 and is pinned to index hub 32 by a pin 41 (see FIGS. 3 and 5) so that shaft 39 and hub 32 are constrained to rotate together. There are additional apertures 42 and 43 through shaft 39 for pin 41; see FIG. 1. When rods 28 and 29 are stressed or are in the pre-stressed, bent condition shown in FIGS. 4 and 5, the rods conjointly urge the shaft to rotate back against the direction of the stress. In device 20, as shown, the elastomer rods may bias shaft 39 to rotate clockwise or counterclockwise relative to axis 26, looking toward device 20, as indicated by arrows A in FIG. 3 and arrows B in FIGS. 4 and 5.

The starting condition for the adjustable elastomer torsion bias device 20 may be as shown in FIGS. 1–3, with pin 41 anchoring hub 32 to shaft 39 at a position of maximum displacement from base member/rod holder 21. The starting condition for device 20 may be that shown in FIGS. 1–3, with rods 28 and 29 unstressed. A retaining mechanism presented by two fixed blocks 44 engaging pin 41 (FIG. 3) precludes clockwise rotation of pin 41, hub 32, and shaft 39. If shaft 39 rotates counterclockwise, rods 28 and 29 are bent; when the shaft is released the resilient rods straighten and rotate device 20 clockwise back to its original position (arrow A, FIG. 3).

To pre-stress device 20, so that it will afford a greater bias, hub 32 is rotated about axis 26, compelling shaft 39 to a comparable rotation. For a clockwise rotation of ninety degrees, the resulting condition of device 20 is as illustrated in FIGS. 4 and 5 with device 20 resiliently biasing hub 32 and shaft 39 toward counterclockwise rotation (arrows B) with a predetermined force greater than the bias force exerted by device 20 if the starting condition is the unstressed condition of FIGS. 1–3. Of course, some mechanism must be provided to maintain the pre-stressing rotation of hub 32 illustrated in FIGS. 4 and 5. That retaining mechanism may be a conveyor belt scraper blade mounted on or otherwise connected to shaft 39, or it may be a part of an exercise or physical therapy apparatus. In FIG. 5 the retaining mechanism is shown as two stops 45 engaging pin 41 to limit counterclockwise rotation of pin 41, hub 32, and shaft 39.

To reduce the bias force from device 20, the angle through which hub 32 is deflected may be made smaller than the ninety degree deflection shown in FIGS. 4 and 5. To increase the bias force to a higher range hub 32 may be pinned to shaft 39 at a location closer to base member 21, at the shaft aperture 42 or even closer at the shaft aperture 43. As the working length of elastomer rods 28 and 29 between base member 21 and hub 32 is reduced, the rods become more resistant to bending; the resilient rotary bias available from device 20 is increased. By moving hub 32 to different locations along shaft 39 and by varying the angular deflection of hub 32, virtually any desired resilient rotary bias force may be realized. Of course, the number of locations for hub 32 along axis 26, as determined by the openings for pin 41 in shaft 39, is not limited to the three shown for device 20. Moreover, the direction of the bias force (arrows A in FIG. 3 and arrow B in FIGS. 4 and 5) may be reversed.

FIGS. 6–11

Figure 7:
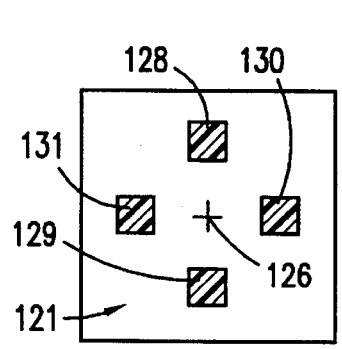
FIG. 7 is a cross section view taken approximately along line 7—7 in FIG. 6.
Figure 8:
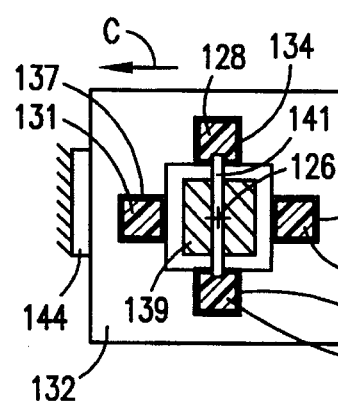
FIG. 8 is a cross section view taken approximately along line 8—8 in FIG. 6.
Figure 11:
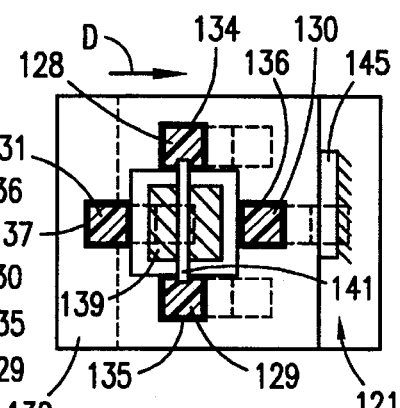
FIG. 11 is a cross section view taken approximately along line 11—11 in FIG. 9.
Figure 9:
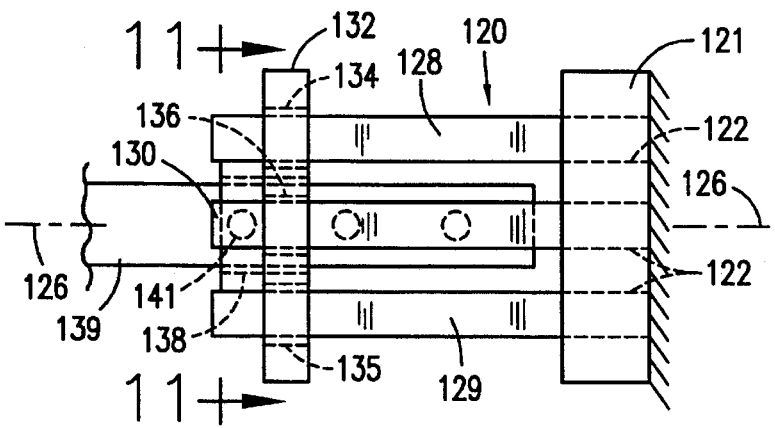
FIG. 9 is an elevation view, like FIG. 6, but with the bias device shown in a stressed condition.
Figure 10:
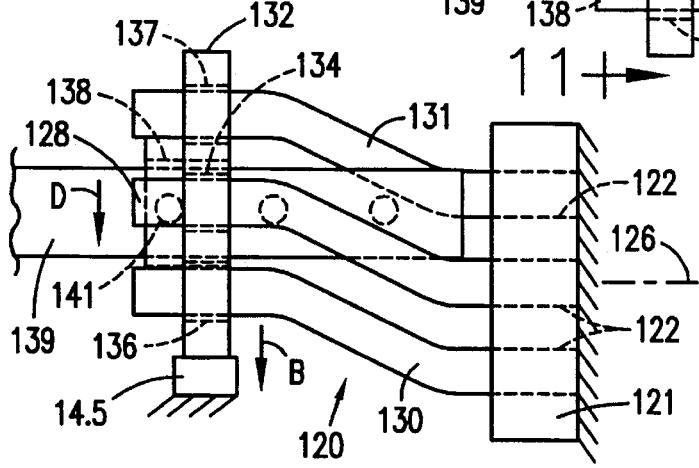
FIG. 10 is a plan view of the device of FIG. 9.

FIGS. 6 and 9 are side elevation views of an adjustable linear elastomer bias device 120 constructed in accordance with another simplified embodiment of the invention. In FIG. 6 device 120 is unstressed; in FIG. 9 it has been pre-stressed to afford an increased linear bias, as explained hereinafter. FIG. 10 is a plan view of device 120 in the stressed condition of FIG. 9. FIGS. 7 and 8 afford cross sectional views of device 120, taken approximately along lines 7—7 and 8—8, respectively, in FIG. 6. FIG. 11 is a cross sectional view taken approximately along line 11—11 in FIG. 9.

Device 120, FIGS. 6—11, comprises a fixed base member 121. There are no base receptacles projecting from base member 121; there are four square rod receptacle apertures 122 through the base member. Rod receptacles 122 are symmetrical about a central axis 126; see FIG. 7. Each rod receptacle 122 extends through the base member; see FIGS. 6, 9 and 10.

In the construction illustrated for the torsion bias device 120, FIGS. 6–11, base member 121 is a square flat plate that is centered on axis 126. As before, base member 121 and its receptacles 122 may be a metal casting. A molded rigid plastic base member may also be used. The particular construction selected for base member 121 and receptacles 122 is again of minor importance with respect to the present invention. However, it is desirable that base member 121 be firmly mounted on a frame (not shown) or other fixed structure.

The adjustable elastomer bias device 120 of FIGS. 6–11 further comprises N elongated elastomer rods 128, 129, 130 and 131; thus, for device 120 N=4. Each rod has one end fixedly mounted in one of the base receptacles 122 of member 121. Each elastomer rod has a predetermined length of at least L; as before, in a typical torsion device 120 length L may be about ten inches (25.4 cm). Length L determines the overall length of device 120 and can vary considerably, depending on the elastomer used for rods 128–131 and the characteristics of those rods as to bendability, resilience, and related factors. A preferred material for the elastomer rods again is urethane having a hardness of about seventy to eighty on a Shore A scale. Rods 128–131 are each illustrated as having a solid square cross-sectional configuration, about one inch (2.54 cm) on a side, but that cross-sectional shape is not critical and can be varied to suit available materials. The cross-sectional shape of base receptacles 122 is preferably matched to that of the rods with which the receptacles are used, so that the rods will all be firmly mounted in base member 121.

Adjustable torsion bias device 120 of FIGS. 6, 9 and 10, further includes an index member 132 that is also shown in FIGS. 8 and 11. Member 132 is shown as having a square shape (FIGS. 8 and 11); the shape of the index member could be some other regular polyhedron, a circular plate, or almost any other desired shape. There are four rod guide passages 134, 135, 136 and 137 through member 132; passage 134 encompasses rod 128, rod 129 extends through passage 135, rod 130 extends through guide passage 136, and rod 131 traverses guide passage 137 (see FIGS. 8 and 11). Thus, in the unstressed condition for device 120 shown in FIGS. 6–8, the guide passages 134 and 135 for elastomer rods 128 and 129 are aligned with the base receptacles for those same rods. The same relationship applies to rods 130 and 131 and their guide passages 136 and 137. The rod guide passages 134–137 are made slightly larger than the cross-sections of the elastomer rods that pass through them so that index member 132 can slide lengthwise along the rods.

For the pre-stressed condition shown in FIGS. 4 and 5, however, with index member 132 linearly displaced from the position of FIGS. 6 and 8 to that of FIGS. 10 and 11 to pre-stress device 120 and bend rods 128–131, the rod receptacles 122 through base member 121 and the rod guide passages 134–137 of member 132 are no longer aligned. Rods 128–131 are straight in the unstressed condition of FIG. 6 but the same rods are bent for the pre-stressed condition shown in FIG. 10. Some twisting of rods 128 and 131 may also occur, but twisting of the rods is minimal; it is the bending of the rods in device 120 that affords a resilient bias.

Index member 132 has a central aperture 138 centered on axis 126. A square rod-like reference member 139 extends through aperture 138 (FIGS. 6, 9 and 10). Reference member 139 may be pinned, as by a pin 141, or may be otherwise releasably anchored to member 132, so that members 132 and 139 are constrained to move conjointly. When rods 128–131 are in the stressed, bent condition shown in FIGS. 10 and 11, the rods conjointly urge the member 139 to move back against the direction of the pre-applied stress. In this instance the elastomer rods bias member 139 to move linearly in the direction of arrows C, FIGS. 10 and 11.

The starting condition for the adjustable elastomer torsion bias device 120 may be as shown in FIGS. 6–8; pin 141 anchors hub 132 to reference member 139 at a position of maximum displacement from base member/rod holder 121. The starting condition for device 120 may be that shown in FIGS. 6–8, with rods 128–131 unstressed. A retaining mechanism represented by a fixed block 144 engaging member 132 (FIG. 8) precludes motion of member 32 and reference member 139 in the direction of arrow C. If index member 139 moves to the right, opposite arrow C, rods 128–131 are bent; when they are released, the resilient rods straighten and bias device 120 back to its original position.

To pre-stress device 120 to afford a greater bias, member 132 is moved to the left, compelling member 139 to a comparable movement. The resulting pre-stressed condition of device 120 is as illustrated in FIGS. 9–11, with device 120 resiliently biasing index member 132 and reference member 139 in the direction of arrows D with a predetermined force greater than the bias force exerted by device 120 in the unstressed starting condition of FIGS. 6–8. Of course, some mechanism must be provided to maintain the pre-stressing movement of member 132. That retaining mechanism may be a part of an exercise or physical therapy apparatus. In FIGS. 9–11 the retaining mechanism is shown as a stop 145 that limits movement of members 132 and 139.

To reduce the bias force of device 120, the distance through which member 132 is deflected may be made smaller than the deflection shown by FIGS. 10 and 11. To increase the bias force to a higher range member 132 may be pinned to member 132 at a location closer to base member 21 at the shaft aperture 142 or even closer at the shaft aperture 143 (FIG. 6). As the working length of elastomer rods 128–131 between base member 121 and index member 132 is reduced, the rods become more resistant to bending so that the resilient bias available from device 120 is increased. By moving member 132 to different locations along member 139 and by varying the linear deflection of index member 132, virtually any desired resilient linear bias force may be realized. Of course, the number of locations for index member 132 along axis 126, as determined by the openings for pin 141 in member 139, is not limited to the three locations shown for device 120 in FIGS. 6, 9 and 10. Of course, the direction of the bias force may be reversed.

FIGS. 12–15

FIGS. 12 and 14 are side elevation views of an adjustable elastomer torsion bias device 220 constructed in accordance with a preferred embodiment of the invention. In FIG. 12 device 220 is unstressed; in FIG. 14 it has been pre-stressed to afford an increased resilient torsional bias, as explained hereinafter. FIG. 13 affords a cross sectional view of device 220, taken approximately along lines 13—13 in FIG. 12. FIG. 15 is a cross sectional view taken approximately along line 15—15 in FIG. 14.

Device 220, FIGS. 12–15, comprises a rod holder or base member 221. There are four base receptacles 222, 223, 224 and 225 projecting from one face of base member 221; receptacles 222–225 are disposed symmetrically about a central axis 226. The other face of base member 221 is affixed to a frame (not shown) or other fixed member. The distribution and arrangement of the receptacles 222–225 in relation to axis 226 and base member 221 is best shown in FIG. 13.

In the construction illustrated for the torsion bias device 220, FIGS. 12–15, base member 221 is a flat circular plate that is centered on axis 226. Base member 221 and its receptacles 222–225 may be a metal casting or may be formed as a metal plate with the receptacles welded to one surface. A molded plastic base member may also be used.

The particular construction selected for base member 221 and its receptacles 222–225 is of minor importance with respect to the present invention. However, it is desirable that base member 221 be firmly mounted on a frame or other fixed structure, as previously noted.

The adjustable elastomer torsion bias device 220 of FIGS. 12–15 further comprises N elongated elastomer rods 228, 229, 230 and 231; thus, as illustrated, in FIGS. 12–14 N=4. Each rod 228–231 has a diameter of about one inch (2.54 cm) and has one end fixedly mounted in one of the base receptacles 222–225. Thus, one end of rod 228 is fixedly mounted in base receptacle 222, one end of elastomer rod 229 is held in receptacle 223, one end of rod 230 is captured in receptacle 224, and the end of rod 231 is fixed in receptacle 225 as shown in FIG. 13. Each elastomer rod has a predetermined length of at least L; in a typical torsion device 220 length L may again be about ten inches (25.4 cm). Length L determines the overall length of device 220 and can vary considerably, depending on the elastomer used for rods 228–231 and the characteristics of those rods as to bendability, resilience, and related factors. A preferred material for the elastomer rods is urethane having a hardness of about seventy to eighty on a Shore A scale. Rods 228–231 are each shown as having a solid circular cross-sectional configuration, but their cross-sectional shape is not critical and can be varied to suit available materials. The cross-sectional shape of base receptacles 222–225 is matched to that of the rods with which the receptacles are used, so that the rods are all firmly mounted in the receptacles of base member 221. Rods 228–231 are shown parallel to axis 226 and perpendicular to base member 221; as before, these relationships may vary for different applications.

Adjustable torsion bias device 220, FIGS. 12 and 14, further includes an index hub 232 that is also shown in FIG. 15. Hub 232 is shown as having a circular shape; the shape of the index hub could be a polyhedron or almost any other desired shape. There are four rings 234, 235, 236 and 237 that are aligned with rod guide passages through index hub 232; the guide passage through ring 234 encompasses rod 228, rod 229 extends through the passage of ring 235, rod 230 extends through the guide passage aligned with ring 236, and rod 31 is engaged in the guide passage through ring 237, as shown in FIG. 15. The guide passages should be slightly larger than rods 228–231 so that hub 232 can slide easily along the rods. To aid in correlating FIGS. 13 and 15, base receptacles 222–225 have been shown in phantom in FIG. 15.

In the unstressed condition for device 220 the guide rings 234–237 for elastomer rods 228–231 are aligned with the base receptacles for those rods; see FIGS. 12 and 13. For the stressed condition shown in FIGS. 14 and 15, however, in which index hub 232 is rotated through an angle of forty five degrees clockwise in comparison with FIG. 12 to stress device 220, the rod receptacles of base member 221 and the rod guide rings and passages of hub 232 are not so aligned. Rods 228–231 are straight in the unstressed condition (see FIG. 12) but the same rods are bent for the stressed condition (FIG. 14). Some twisting of the elastomer rods may occur, but twisting of the rods is no more than minimal; it is the bending of the rods 228–231 that enables device 220 to afford a resilient torsional bias.

Index hub 232 has a central aperture that is symmetrical about axis 226. A shaft 239, which may be the support shaft of a conveyor belt scraper or may be an operating shaft of a physical therapy device, extends through the central aperture in hub 232 and a ring 240 affixed to hub 232 is connected to the shaft by a pin 241 (see FIGS. 12 and 14) so that shaft 239 and hub 232 rotate together. Thus, when rods 228–231 are in the stressed, bent condition shown in FIGS. 14 and 15 the elastomer rods conjointly urge the shaft to rotate back against the direction of the pre-applied stress. In this instance the elastomer rods bias shaft 239 to rotate in a counterclockwise direction relative to axis 226 as viewed in FIGS. 13 and 15. The direction of bias can, of course, be reversed by reversing the direction of stress.

The starting condition for the adjustable elastomer torsion bias device 220 may be as shown in FIGS. 12 and 13, with pin 241 anchoring hub 232 to shaft 239 at a position of appreciable displacement from base member/rod holder 221. The starting condition for device 220 may be that shown in FIGS. 12 and 13, with rods 228–231 unstressed. A retaining mechanism, now shown, precludes clockwise rotation of pin 241, hub 232, and shaft 239. If shaft 239 is rotated counterclockwise, rods 228–231 are bent; when the shaft is released the resilient rods straighten and bias device 220 rotationally back to its original position, FIGS. 12 and 13.

To pre-stress device 220, so that it will afford a greater bias, hub 232 is rotated about axis 226, compelling shaft 239 to a comparable rotation. For a clockwise rotation of forty-five degrees the resulting condition of device 220 is as illustrated in FIGS. 14 and 15 with device 220 resiliently biasing hub 232 and shaft 239 toward counterclockwise rotation with a predetermined force greater than the bias force exerted by device 220 if the starting condition is the unstressed condition of FIGS. 12 and 13. Of course, some mechanism must be provided to maintain the pre-stressing rotation of hub 32 illustrated in FIGS. 4 and 5. That retaining mechanism may be a conveyor belt scraper blade mounted on or otherwise connected to shaft 239, or it may be a part of an exercise or physical therapy apparatus.

To reduce the bias force from device 220, the angle through which hub 232 is deflected may be made smaller than the forty-five degree deflection shown by FIGS. 14 and 15. To increase the bias force the angular pre-stress rotation of hub 232 may be made larger than the forty-five degrees shown in FIGS. 14 and 15. To increase the bias force to a higher range hub 232 may be pinned to shaft 239 at a location closer to base member 221 than illustrated. As the working length of elastomer rods 228–231 between base member 221 and hub 232 is reduced, the rods become more resistant to bending and the resilient rotary bias available from device 220 increases. By moving hub 232 to different locations along shaft 239, virtually any desired resilient rotary bias force may be realized. Of course, the number of locations for hub 232 along axis 226, as determined by the openings for pin 241 in shaft 239, is not limited to the five shown for device 220. Moreover, the direction of the bias force may be reversed.

FIGS. 16–18

Figure 16:
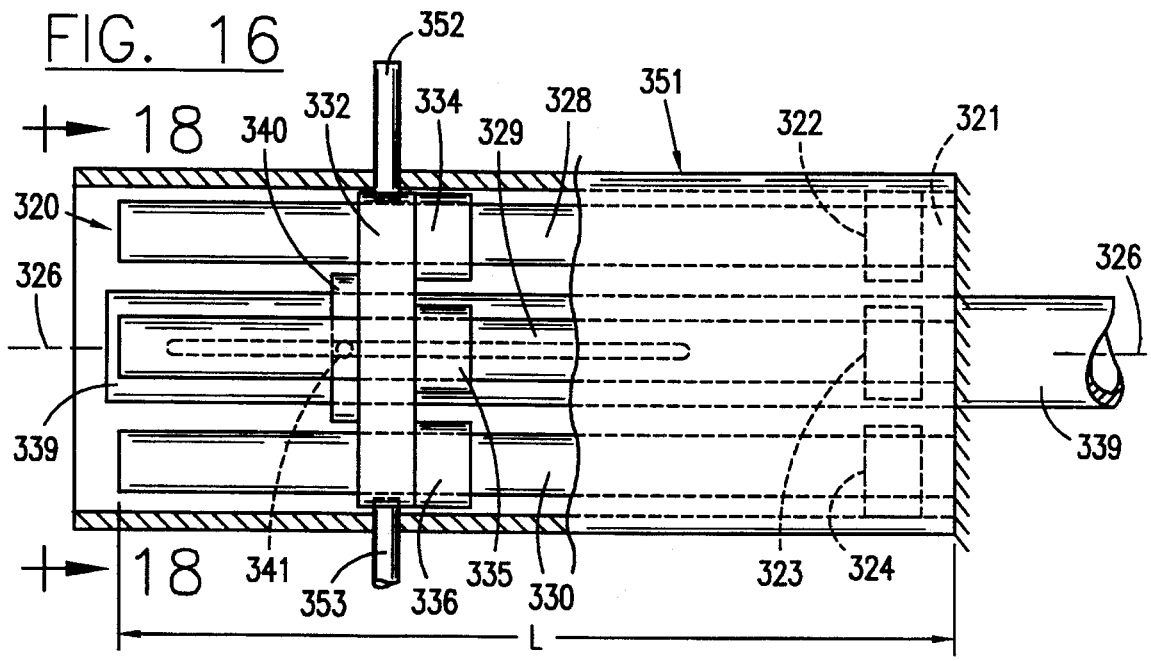
FIG. 16 is a side elevation view of a cover and anchoring mechanism for an adjustable elastomer torsion bias device like that of FIGS. 12 and 14.
Figure 17:
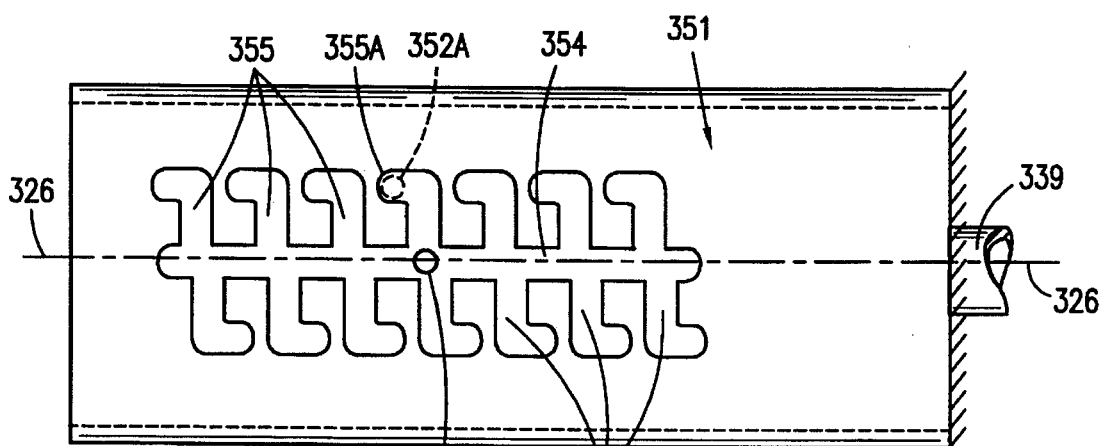
FIG. 17 is a plan view of the apparatus of FIG. 16.
Figure 18:
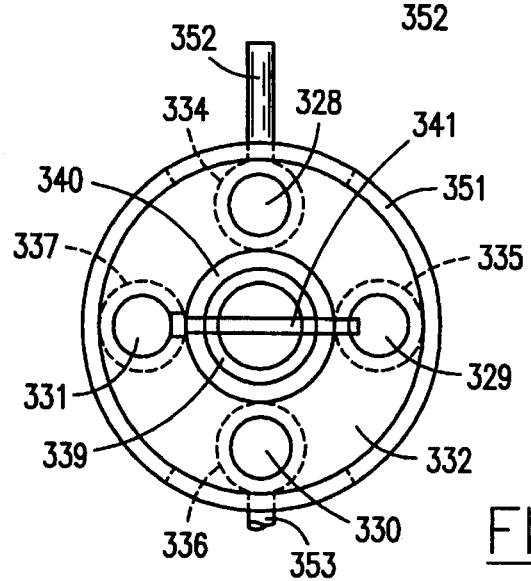
FIG. 18 is an end elevation view taken approximately as indicated by line 18—18 in FIG. 16.

FIG. 16 is a side elevation view of an adjustable elastomer torsion bias device 320 constructed in accordance with another preferred embodiment of the invention; the adjustable torsion bias device is much like device 220 of FIGS. 12–15 but with minor modifications and a cover that also serves as part of a rotary deflection retainer. FIG. 17 affords a plan view of device 320. FIG. 18 is an end elevation view taken approximately along line 18—18 in FIG. 16. Device 320 comprises a rod holder or base member 321. There are four base receptacles projecting from one face of base member 321; three receptacles 322, 323 and 324 appear in FIG. 16. The base receptacles are disposed symmetrically about a central axis 326. The other face of base member 321 is affixed to a frame (not shown) or other fixed member.

In the construction illustrated for the torsion bias device 320, FIGS. 16–18, base member 321 is a flat circular plate that is centered on axis 326. Base member 321 and its receptacles, such as receptacle 322, may be a metal casting or may be formed as a metal plate with the receptacles welded to one surface. A molded plastic base member may also be used. The particular construction selected for base member 321 and its receptacles is of minor importance with respect to the present invention. However, it is desirable that base member 321 be firmly mounted on a frame or other fixed structure, as previously noted.

The adjustable elastomer torsion bias device 320 of FIGS. 16–18 further comprises four elongated elastomer rods 328, 329, 330 and 331 (see FIGS. 16 and 18); thus, as illustrated, in device 320 N=4. Each elastomer rod has one end fixedly mounted in one of the base receptacles. Thus, one end of rod 328 is fixedly mounted in base receptacle 322, one end of elastomer rod 329 is held in receptacle 323, and one end of rod 330 is captured in receptacle 324 (see FIG. 16). Each elastomer rod has a predetermined length of at least L; in a typical torsion device 320 length L may again be about ten inches (25.4 cm). Length L determines the overall length of device 320 and can vary considerably, depending on the elastomer used for the rods and the characteristics of those rods as to bendability, resilience, and related factors. A preferred material for the elastomer rods is urethane having a hardness of about seventy to eighty on a Shore A scale. Rods 328–331 are each shown (FIG. 18) as having a solid circular cross-sectional configuration with a diameter of about one inch (2.54 cm), but their cross-sectional shape is not critical and can be varied to suit available materials. The cross-sectional shape of the base receptacles is again matched to that of the rods with which the receptacles are used, so that the rods are all firmly mounted in the receptacles of base member 321. the elastomer rods are shown parallel to axis 326 and perpendicular to base member 321; as before, these relationships may vary for different applications.

Adjustable torsion bias device 320 of FIGS. 16–18 further includes an index hub 332; see FIGS. 16 and 18. Hub 332 is shown, in FIG. 18, as having a circular shape; the shape of the index hub could be a polyhedron or almost any other desired shape. There are four guide rings 334, 335, 336 and 337; rings 334–336 are shown in FIG. 16 and all of the guide rings 334–337 appear in FIG. 18. Guide rings 334–337 are each aligned with a rod guide passage through index hub 332. The guide passage through ring 334 encompasses rod 328, rod 329 extends through the passage of ring 335, rod 330 extends through the guide passage aligned with ring 336, and rod 331 is engaged in the guide passage through ring 337, as shown in FIG. 18. All of the guide passages should be slightly larger than the resilient elastomer rods passing through them so that hub 332 can move easily along the rods.

In the illustrated unstressed condition for device 320 the guide rings 334–337 for elastomer rods 328–331 are all aligned with the base receptacles for those rods. Rods 328–331 are straight in the unstressed condition (see FIG. 16) but the same rods are bent for the stressed condition of the device. Some twisting of the elastomer rods may occur, but twisting of the rods is no more than minimal; it is the bending of the rods 328–331 that enables device 320 to afford a resilient torsional bias.

Index hub 332 has a central aperture that is symmetrical about axis 326. A shaft 339, which may be the shaft of a conveyor belt scraper or a physical therapy apparatus, extends through the central aperture in hub 332 and through a ring 340 affixed to hub 332. Ring 340 is pinned to shaft 339 by a pin 341 (see FIGS. 16 and 18) so that shaft 339 and hub 332 must rotate conjointly. Thus, when rods 328–331 are in their stressed, bent condition the elastomer rods conjointly urge the shaft to rotate back against the direction of the pre-applied stress. In device 320 the elastomer rods bias shaft 339 to rotate either clockwise or counterclockwise, relative to axis 226, depending on the stress applied to the device.

The starting condition for the adjustable elastomer torsion bias device 320 may be as shown in FIGS. 16 and 18, with pin 341 anchoring hub 332 to shaft 339 at a position well displaced from base member/rod holder 321. That position can be varied continuously because pin 341 engages in a slot 349 in shaft 339 (see FIG. 16) and can move anywhere along the slot. The starting condition for device 320 thus may be that shown in FIGS. 16 and 18 with the elastomer rods 328–331 all straight and unstressed. If shaft 339 is rotated, clockwise or counterclockwise, rods 328–331 are bent; when the shaft is released the resilient rods straighten and rotate device 320 back to its original position.

Adjustable torsion bias device 320 further includes a cylindrical cover 351 that also serves as part of a retainer that maintains hub 332 in a pre-stressed rotated position. Two rigid rod-like handles 352 and 353 affixed to hub 332 project diametrically outwardly of the hub through longitudinal guide slots in cover 351; one of those guide slots 354, through which handle 352 extends, appears in FIG. 17. On one side of longitudinal guide slot 354 there are a plurality of lateral guide slots 355; a similar group of position slots 356 extend laterally of the other side of longitudinal slot 354. See FIG. 17. To pre-stress device 320 in a counterclockwise direction, as viewed in the same direction as FIG. 18, handle 352 is moved to the position 352A shown in FIG. 17, with the handle ending up in a receptacle 355A in cylinder 351. A corresponding movement occurs with respect to the other handle 353. From FIG. 17 it will be seen that this pre-stress movement, using handle 352 and slots 355, provides seven counterclockwise pre-stressed locations, and that there are seven similar pre-stressed clockwise locations afforded by slots 356. These numbers are determined by the number of lateral slots 355 and 356 and their end receptacles; more slots and more receptacles can be provided in cylinder 351 if desired.

From the foregoing description, it will be apparent that each of the devices 20, 120, 220 and 320 utilizes a plurality of N bendable, resilient, elastomer rods and affords a resilient bias that is adjustable over a wide bias force range. For the embodiment 20 of FIGS. 1–5, N=2; for all other illustrated embodiments N=4. N may be any integer larger than one. The devices 20, 220 and 320 are all torsion bias devices, usable as the "tensioners" in conveyor belt scrapers or in a variety of different physical therapy/exercise devices. Device 120 employs much the same construction in a linear bias mechanism. In all of these devices the bias force is derived from bending of elastomer rods; twisting effects are negligible. All of these devices are simple and inexpensive in construction, all are reversible, and all are quite durable.

I claim:

1. An adjustable elastomer bias device comprising:

a rigid, fixed base member having N base receptacles, N being an integer larger than one;

N elongated organic elastomer rods each having a predetermined length of at least L and a predetermined cross sectional area, one end of each elastomer rod being firmly mounted in each base receptacle with the rods projecting from the base member in a preselected direction;

an index member having at least N rod guide passages therethrough, each rod passage through the index member having a cross-sectional area larger than the cross sectional area of the elastomer rod that passes therethrough so that the index member is movable longitudinally along the elastomer rods;

and anchor means for anchoring the index member at any one of a plurality of different displacements, in the preselected direction, from the base member.

2. An adjustable elastomer bias device according to claim 1 in which N=4.

3. An adjustable linear elastomer bias device according to claim 1 in which the elastomer rods are all bent in a linear direction transverse to the preselected direction and in which the bias device biases the index member toward movement in that linear direction.

4. An adjustable linear elastomer bias device according to claim 3 and further comprising a retainer limiting bending of the elastomer rods in a direction opposite to the linear direction.

5. An adjustable linear elastomer bias device according to claim 4 in which the retainer is disposed immediately adjacent to and is engaged by the index member.

6. An adjustable linear elastomer bias device according to claim 5 in which N≧4 and in which the elastomer rods are disposed symmetrically about an axis that extends through the base member and the index member in the preselected direction.

7. An adjustable linear elastomer bias device according to claim 1 in which the anchor means comprises:

an elongated reference member extending through the index member in the preselected direction, toward the base member; and a connector to connect the index member to the reference member at any of at least several positions along the reference member.

8. An adjustable linear elastomer bias device according to claim 7 in which the reference member has a plurality of apertures therein transverse to the preselected direction, the index member has at least one opening therein transverse to the preselected direction, and the connector is engaged in the index member opening and in one of the reference member apertures.

9. An adjustable elastomer torsion bias device according to claim 8 in which the reference member is a shaft having a slot therein transverse to the preselected direction with the slot elongated in the preselected direction, and the connector is a projection extending from the index member into the shaft slot.

10. An adjustable elastomer torsion bias device according to claim 9 in which:

the connector is a pin affixed to and projecting from the index member into the shaft slot.

11. An adjustable elastomer torsion bias device according to claim 1 in which:

the index member and the base member are displaced from each other along an axis extending in the preselected direction;

the index member is rotatable from an initial position in a given angular direction, about the axis, relative to the base member; and the elastomer rods bias the index member, rotationally, toward its initial position.

12. An adjustable elastomer torsion bias device according to claim 11 and further comprising:

a retainer to restrain the index member against angular movement, about the axis and away from its initial position, in a given angular direction while permitting unobstructed movement of the index member in the opposite angular direction.

13. An adjustable elastomer bias device according to claim 1 and further comprising an elongated cover having a length of at least L covering the base member, the rods, the index member, and the anchor means.

14. An adjustable elastomer bias device according to claim 13 in which the cover is of cylindrical configuration and encloses the base member, the rods, the index member and the anchor means.

15. An adjustable elastomer bias device according to claim 13 in which the cover includes an elongated longitudinal guide slot in the cover, parallel to the preselected direction, a plurality of lateral position slots projecting transversely from the guide slot, and a plurality of receptacle slots projecting from the position slots in spaced relation to the longitudinal guide slot.

16. An adjustable elastomer bias device according to claim 15 and further comprising a handle projecting outwardly of the index member through one of the guide, position, and receptacle slots.

\* \* \* \* \*